US006911603B2

(12) United States Patent
Cadus et al.

(10) Patent No.: US 6,911,603 B2
(45) Date of Patent: Jun. 28, 2005

(54) DISTRIBUTION FRAME FOR FILM CONDUCTORS

(75) Inventors: Bernd Cadus, Duernau (DE); Juergen Ries, Schoensee (DE); Siegfried Schreiber, Althengstett (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/837,586

(22) Filed: May 4, 2004

(65) Prior Publication Data

US 2004/0203265 A1 Oct. 14, 2004

Related U.S. Application Data

(63) Continuation of application No. PCT/EP03/02060, filed on Feb. 28, 2003.

(30) Foreign Application Priority Data

Mar. 5, 2002 (DE) ........................................ 102 09 771

(51) Int. Cl.[7] ............................ H02B 1/20; H02G 5/00

(52) U.S. Cl. .................. 174/68.2; 174/70 B; 174/72 B; 174/149 B; 361/611

(58) Field of Search ............................ 174/68.2, 70 B, 174/71 B, 72 B, 88 B, 99 B, 129 B, 133 B, 149 B; 361/611, 624, 637, 648

(56) References Cited

U.S. PATENT DOCUMENTS

| | | | | |
|---|---|---|---|---|
| 2,780,788 A | * | 2/1957 | Dyer et al. | 439/114 |
| 5,383,090 A | * | 1/1995 | Freundner et al. | 361/624 |
| 6,257,938 B1 | | 7/2001 | Day et al. | |
| 6,690,097 B2 | * | 2/2004 | Pierrot | 307/42 |
| 6,693,370 B2 | * | 2/2004 | Yamane et al. | 307/10.1 |
| 6,794,576 B1 | * | 9/2004 | Justason et al. | 174/72 B |
| 6,803,523 B2 | * | 10/2004 | Yuasa et al. | 174/88 R |

FOREIGN PATENT DOCUMENTS

| | | |
|---|---|---|
| DE | 21 64 280 | 7/1973 |
| DE | 198 12 417 A1 | 9/1999 |
| EP | 0 701 924 A2 | 3/1996 |
| EP | 1 157 892 A1 | 11/2001 |
| WO | WO 91/08134 | 5/1991 |

* cited by examiner

*Primary Examiner*—Dean A. Reichard
*Assistant Examiner*—Adolfo Nino
(74) *Attorney, Agent, or Firm*—Crowell & Moring LLP

(57) ABSTRACT

A distribution frame for film conductors is provided having a first busbar, arranged in a recess in a part-shell, for a first signal path and a second busbar, arranged in a recess in a part-shell, for a second signal path. Each busbar can be connected, via a bridging element, to two or more film conductors coupled to electrical components, the connection between a busbar and an electrical component can be released by moving the bridging element. The two part-shells abut against one another at an interface when the distribution frame is assembled. The film conductors of a signal path are routed through one or more ducts in a part-shell and are bent back at the end of the duct(s) such that the bent-back part of the film conductors is arranged in the region of the interface between the part-shells when the distribution frame is assembled.

20 Claims, 1 Drawing Sheet

DISTRIBUTION FRAME FOR FILM CONDUCTORS

CROSS-REFERENCE TO RELATED APPLICATIONS

This application is a continuation of PCT Application No. PCT/EP03/02060 filed on Feb. 28, 2003.

BACKGROUND AND SUMMARY OF THE INVENTION

The invention relates to a distribution frame for film conductors having a first busbar, arranged in a recess in a part-shell, for a first signal path, and a second busbar, arranged in a recess in a part-shell, for a second signal path. Each busbar can be connected, via a bridging element, to two or more film conductors coupled to electrical components. The connection between a busbar and an electrical component can be released by moving the bridging element. The two part-shells abut against one another at an interface when the distribution frame is assembled.

In engineering systems, in particular in vehicles, conventional cable harnesses comprising electrical copper lines are increasingly being replaced by modern conduction techniques. Data bus systems are in this case used for digital signal transmission and can transmit messages via the data bus from a control unit to a further control unit. Data bus systems of this type have either one or more copper conductors by which the encoded messages are transmitted. An example of this is the CAN bus having two lines, between which a difference signal is tapped off for signal evaluation, or the more developed CAN-C data bus having three data bus lines, the ground connection generally being provided via the vehicle chassis.

In particular in the case of the CAN bus, the messages are transmitted at a transmission rate of up to 1 Megabit per second. At these high transmission rates, very high demands are placed on the electrical lines. In particular, the wiring to the various nodes, i.e. the control units, sensors, actuators, switches or star couplers, is of great importance here. In this case, distribution frames are used at which the lines, from and to the various subscribers, are electrically conductively connected to lines from other subscribers.

In the case of vehicles, in particular in the case of motor vehicles, so-called film conductors are used, the electrical conductor being applied in the form of a metallic conductor track on a film mount. Such film conductors can be produced from a base material, for example using known techniques by light exposure and etching, so that two or more specifically designed electrical conductors are arranged on one film conductor. The film conductor can then be laid as a whole on the vehicle chassis or on film conductor mounts provided specifically for this purpose within the vehicle. In particular, where a large number of conductors having a small conductor cross section have to be laid, film conductors have been shown to have good mechanical strength and to be safe in terms of electromagnetic compatibility.

In the case of vehicles, vibrations at differing frequencies occur during operation, which makes the design of plugs and distribution frames for film conductors highly important. In a distribution frame, more than two electrical conductors are joined together and have to be electrically conductively connected. An example of such a distribution frame is a so-called star coupler for a data bus. Nowadays, high-performance data buses are often star-connected, i.e. the subscribers are not directly connected to one another via a data bus but each subscriber is connected, via the data bus, to the star coupler which in turn passes the messages on, in the manner of a star, to the other subscribers. Such a design for the data bus topology increases the reliability of the data bus. In particular, there is no interruption in the data bus if an individual subscriber fails. Furthermore, when star couplers are used, the messages transmitted on the data bus can be monitored and filtered more effectively.

When film conductors are used for analog signal transmission via individual film conductors or when digital messages are transmitted via a data bus, the film conductors are stripped of insulation in the region of a contact point and held in electrically conductive contact with other film conductors by being crossed over at points wherein the insulation has likewise been stripped. If distribution frames are used for a larger number of film conductors, owing to the improved ease of maintenance, busbars are usually used which are electrically conductively connected to the film conductors of one signal path. Distribution frames of this type having busbars are usually too large to be used in a space-saving manner in vehicles. In addition, they do not allow individual conductor branches and data bus branches having the subscribers coupled to them to be isolated in a simple manner.

One object of the present invention is to develop a distribution frame for film conductors of the type described initially such that a compact distribution frame for film conductors is provided, in which electrical components of a signal path can be connected or disconnected in a simple manner.

This object is achieved according to the invention by providing distribution frame for film conductors having a first busbar, arranged in a recess in a part-shell, for a first signal path (CAN-low) and a second busbar, arranged in a recess in a part-shell, for a second signal path (CAN-high), in which each busbar can be connected, via a bridging element, to two or more film conductors (2–5) coupled to electrical components. The connection between a busbar and an electrical component can be released by moving the bridging element, and the two part-shells abut against one another at an interface when the distribution frame is assembled. The film conductors of a signal path are routed through one or more ducts in a part-shell and are bent back at the end of the duct(s) such that the bent-back part of the film conductors is arranged in the region of the interface between the part-shells when the distribution frame is assembled. According to these features, the film conductors of a signal path are routed through one or more ducts in a part-shell and are bent back at the end of the duct(s) such that the bent-back part of the film conductors is arranged in the region of the interface between the part-shells when the distribution frame is assembled.

The distribution frame has two part-shells, in particular an upper shell and a lower shell, a busbar being arranged in each part-shell. The film conductors of different parallel signal paths are routed through one or more ducts in a part-shell and are bent back such that the bent-back film conductor end comes to rest between the two part-shells in recesses which may be provided for this purpose. The bent-back ends of the film conductors have the insulation stripped from them in certain sections such that each individual flat conductor track of the film conductor can be electrically conductively connected to a busbar by the use of an adjacent bridging element. The distribution frame operates in such a way that the electrical signal is transmitted from an electrical component, via the film conductor, to the bent-back part of the film conductor and from there via the bridging element used to the busbar, further electrical components being electrically conductively coupled to the busbar and it being possible also to connect and disconnect bridging elements there.

The bent-back parts of the film conductor(s) are preferably arranged on a plane which, when the distribution frame is assembled, lies parallel to a plane in which a busbar lies.

By this means, the bent-back part of the film conductor is arranged essentially parallel to the busbar such that they are both pressed against the bridging element arranged between them when the part-shells of the distribution frame are assembled. If the film conductor and the busbar have the insulation stripped from them and are arranged geometrically such that the electrically conductive bridging element produces the contact between the two, electrical components can be coupled to and decoupled from the distribution frame by inserting the bridging element.

The distribution frame can be used, for example, in conjunction with a twin-conductor data bus, in particular in the case of a CAN bus film conductor with the CAN-high conductor track being assigned to one part-shell and the CAN-low conductor track to the other part-shell. Starting from an electrical component, with the CAN bus, the ground is connected to the vehicle chassis whereas the first film conductors having the CAN-high signals are routed to the upper part-shell of the distribution frame and via the respective bridging elements to the busbar in the upper part-shell, whereas the film conductors having the CAN-low signals are routed to the lower part-shell and via the associated bridging elements to the busbar in the lower part-shell. Since all of the film conductors of all of the components are connected to the star coupler using the respective busbars in this manner, each electrical component can be disconnected from the star coupler by removing the bridging elements.

The distribution frame according to the invention ensures a reliable electrical connection of any number of bus subscribers, in each case separately in signal lines having the CAN-high and the CAN-low signal. Each bus subscriber can be disconnected from the bus system via the bridging element. This makes it possible to test each bus subscriber, i.e. each electrical component connected to the distribution frame, individually once it has been disconnected, and to operate them separately.

In one development of the invention, the distribution frame comprises two plastic part-shells, namely an upper and a lower shell. The two part-shells are pressed together to form a housing by means of a latching mechanism, once they have been fitted with the film conductors and the bridging elements. The lower part-shell serves the purpose of accommodating the film conductors having the CAN-high signal, the busbar in this lower part-shell being seated firmly in the plastic mount. The length of the busbar corresponds at least to the total width of the respective film conductor and acts as a collection point for all of the incoming CAN-high signals. Over the busbar there are, at a distance from the film-conductor conductor tracks to be connected, two or more recesses formed in the plastic mount. A bridging element in the form of a metal platelet can be clipped into these recesses. For this purpose, the metal platelets are slightly longer than the recess, producing a slight prestress which makes it easier for contact to be made with the film conductors from which the insulation has been stripped on the one hand and the busbar on the other. The bridging elements are in this case no wider than the width of one film-conductor conductor track, but are sufficiently long to short-circuit the busbar lying underneath to the film-conductor conductor track above it.

As described above, recesses for two or more bridging elements are provided in each part-shell. In one alternative embodiment, moveable switching tongues are arranged in the recesses for the bridging elements and can be adjusted on the outside of the distribution frame by associated switching knobs or slides. Bridging elements of this type need not be clipped-in in this case but are connected and disconnected by means of a switch on the outside of the distribution frame. In this case, the distribution frame need not be dismantled when an electrical component needs to be disconnected from the data bus. A secured cover on the outside of the distribution frame prevents any inadvertent adjustment taking place.

Each film conductor or each film-conductor conductor track is routed through a duct in a part-shell and bent back through 90 degrees at the edge of the part-shell where the film conductor emerges, so that the film conductor comes to rest, in the region of the interface between the part-shells, parallel to the plane of the busbar when the distribution frame is assembled. The invention may, however, also be adapted by changing the geometry so that, for example, the film conductor is not bent back through an acute or obtuse angle unless the duct in one part-shell is aligned at an oblique angle with respect to the interface between the part-shells.

In the case of a distribution frame for a twin-conductor CAN bus, the upper shell serves the purpose, for example, of receiving the CAN-low signals and the lower part-shell serves the purpose of receiving the CAN-high signals. The construction of the upper part-shell corresponds in principle to that of the lower part-shell. In one embodiment, however, provision may be made for all of the film conductors to be routed through the duct in one part-shell and for recesses for the bent-back conductors only to be formed in this part-shell. The recesses for the bridging elements and for the busbar arranged behind said bridging elements and perpendicular thereto are in this case provided in the respective other part-shell. The components fitted to the upper and lower part-shell can be changed at any time, that is as long as a film conductor and a busbar contact are provided in the original construction of the distribution frame, an electrical component can be connected or disconnected by inserting or leaving out the bridging element. In the version with the clipped-in metal platelets, a thin hole is provided in one part-shell, by means of which the metal plates can be pushed out of their recess from the outside such that specific electrical components can be isolated from the data bus by leaving out a bridging element.

In order to make it possible to test disconnected bus subscribers individually, windows are provided within the film of the film conductor shortly downstream of where the film conductor emerges from the duct in a part-shell, in order to provide electrical access for test probes for each film-conductor conductor track.

If the distribution frame for a data bus is provided with more than two data bus conductors, the distribution frame may be provided in modified form. In the case of a CAN-C distribution frame, each bridging element may be used as a mount for a ferrite core for decoupling the signals. In order to cool the ferrite cores, lateral cooling holes are then provided on the part-shells. When a part-shell is viewed from above, the distribution frame has mutually adjacent recesses for the bridging elements, a bridging element firstly for a CAN-high, then for a CAN-low film conductor and finally a recess for a third bridging element in each case being provided alternately. These three recesses are then provided for each electrical component, the recesses for the bridging elements for further electrical components lying next to those for the first component. The bridging element for the third data bus conductor bridges the two busbars arranged in the respective part-shells of the distribution frame by means of two passive components, for example resistors or diodes, in the form of flat bridging elements. A contact is provided between these bridging elements and a filter, for example a low-pass filter such as an RC element. A further contact in this case provides the electrical connection between the filter and the bent-back part of the film conductor for the third data bus conductor of an electrical component.

BRIEF DESCRIPTION OF THE DRAWINGS

There are various ways in which the teaching of the present invention can be advantageously refined and developed. Reference is made for this purpose to the subclaims, on the one hand, and, on the other hand, to the description below of an embodiment. One embodiment of the distribution frame according to the invention is illustrated in the drawing, in which:

DETAILED DESCRIPTION OF THE DRAWINGS

Figure 1:
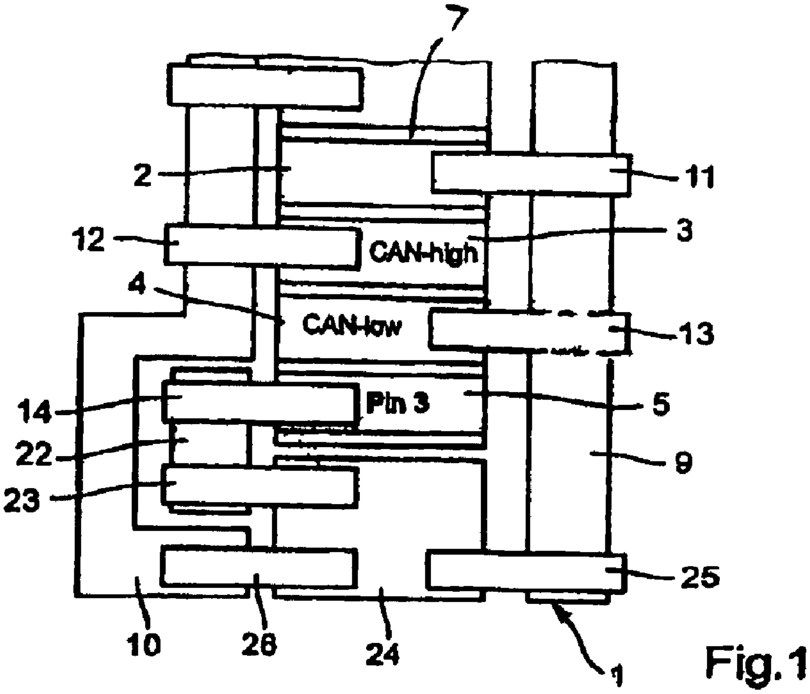
FIG. 1 shows a schematic illustration of a section through the distribution frame according to the invention for film conductors in the region of the contact interfaces of the two part-shells.

The distribution frame 1 for film conductors 2–5 has at least a two-part plastic housing comprising an upper part-shell 6 and a lower part-shell 7, which bear against one another at an interface 15 when the distribution frame 1 is assembled. The two part-shells 6, 7 are held together by an interlocking connection such as by latching or by a releasable screw connection.

The distribution frame 1 is in the form of a star coupler for a CAN-C bus having three data bus lines, CAN-high 3, CAN-low 4 and central conductor 5. The distribution frame 1 is connected in the form of a star coupler between the data bus lines of the various electrical components connected to the data bus. In contrast to a conventional twin-wire CAN bus, three conductor tracks 3, 4 and 5 thus run between each electrical component and the distribution frame 1, all of the CAN-low signals coming from the electrical components being combined at a first busbar 9 and all of the CAN-high signals coming from the electrical components being combined at a second busbar 10 in the distribution frame 1. The distribution frame 1 is in the form of a star coupler even for complex data bus networks which comprise, for example, a combination of star nodes and ring data bus networks.

In the present invention, the data bus lines are in the form of film conductors 2–5 having metallic film-conductor conductor tracks arranged on them. The film conductors 2–5 coming from the electrical components are routed through one or more ducts 16 in the lower part-shell 7 and are bent back at their ends so that the film conductors 2–5 have a bent-back part 17. In the embodiment illustrated in FIG. 2, the duct 16 formed within the lower part-shell 7 is essentially perpendicular to the wall forming the interface 15 between the two part-shells 6, 7. A recess for each bent-back part 17 of the film conductors 2–5 is provided on the wall of the part-shell 7 in the region of the interface 15. The film conductors 2–5 have the insulation stripped from them in places and are preferably arranged in the distribution frame such that the CAN-low conductor track 4 and, if appropriate, a third conductor track 5 of an electrical component are arranged next to the CAN-high conductor track 3, and then the conductor tracks to a further electrical component in each case come to rest in the adjoining recesses and, again in an adjoining manner, the conductor tracks of another electrical component come to rest in the recesses such that they are bent back.

Figure 3:
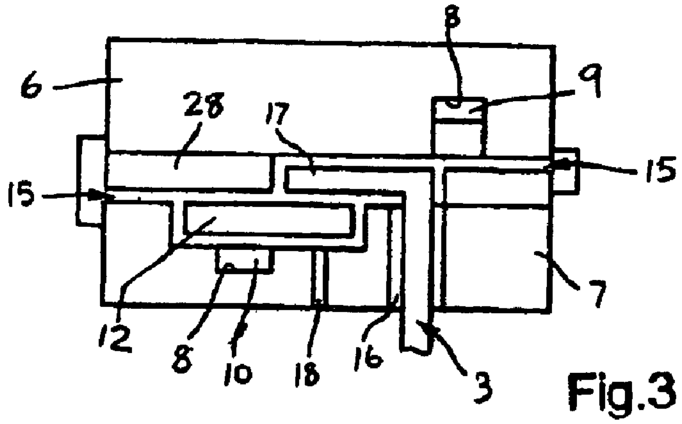
FIG. 3 shows a schematic illustration of a section perpendicular to the plane of the busbars in the region of a bridging element for a film conductor having a CAN-high signal.

As can be seen in FIG. 3, in addition to the film conductor 4 having the CAN-low signal, the film conductor 3 having the CAN-high signal is also routed through the duct 16 in the lower part-shell 7 and the film conductor 3 is bent back in the region of its end such that it forms a bent-back part 17 at the interface 15 between the two part-shells 6 and 7. In the upper part-shell 6, the busbar 9 is arranged within a recess 8 in the upper part-shell 6 and the busbar 10 is arranged within a recess 8 in the lower part shell 7 such that it runs parallel to the bent-back part 17 of the film conductor 3. All of the CAN-high signals of the electrical components are combined at the busbar 10 and are distributed accordingly to the other electrical components. A bridging element 12 is arranged within a recess between the bent-back part 17 of the film conductor 3 and the busbar 10 and electrically conductively connects the bent-back part 17 of the film conductor 3 to the busbar 10, provided the bridging element 12 is inserted in the recess provided for this purpose in the distribution frame. The bridging element 12 is in the form of a metal platelet which can be clipped into the recess provided for this purpose. A hole 18 is provided within the part-shell 7 in order to push the clipped-in platelet out of the part-shell 7 again. The metal platelet 12 is longer than the recess in one dimension so that, when it is being pushed into the recess, a slight prestress is produced which also assists the electrical contact-making.

Figure 2:
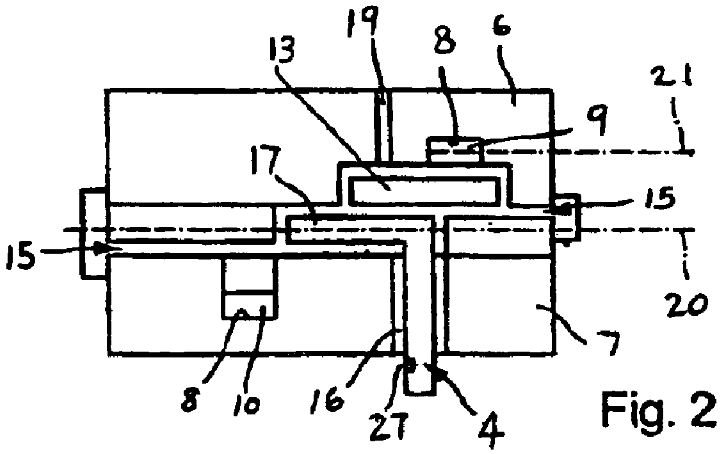
FIG. 2 shows a schematic illustration of a section though the distribution frame perpendicular to the plane of the busbars and in the region of a bridging element for a CAN-low film conductor.

FIG. 2 shows how the signal path of a CAN-low signal makes contact, via the film conductor 4, with the busbar 9 for the incoming CAN-low signals. Again, the film conductor 4 is routed through the lower part-shell 7 through a duct 16 and is bent back. In contrast to the contact for the CAN-high signals in FIG. 3, the bridging element 13 in this case is arranged in a recess 8 in the upper part-shell 6 in order to electrically conductively connect the stripped, bent-back part 17 of the film conductor 4 to the busbar 9 in the recess 8 in the upper part-shell 6. For this purpose, the bridging element 13 is clipped into the recess from which the prestressed metal platelet is pushed out again through a hole 19. The latching mechanism or the screw connection of the two part-shells 6 and 7 also fixes the film conductors 2–5, the bridging elements 12–14 and, if appropriate, the busbars 9 and 10 inside their recess provided.

The bent-back parts 17 of the film conductors 2–5 lie on one plane 20 which is in turn parallel to the plane 21 on which the busbar 9 is arranged. In this manner, when the two part-shells 6, 7 are assembled, electrical contact is made in a simple manner with the bridging elements 12–14 at the interface 15. Of course, an embodiment with a slightly different, geometry may also be provided, in which the bent-back parts 17 and the bridging elements 12–14 are arranged at an acute angle with respect to the plane 20 such that, when the part-shells 6, 7 are joined together, electrical contact is made. The duct 16 may also be arranged parallel to the interface 15 or at an oblique angle thereto.

In the embodiment illustrated in FIG. 1, an additional third PIN 5 is provided, which is required when a CAN-C distribution frame is provided. A bridging element 14 makes contact with an RC element 22, in the form of an electrical filter, which is in turn connected to an electrical component 24, which may be flat, via a bridging element 23. This electrical component 24 may either be a piece of metal having a ferrite core for decoupling the data bus signals or be in the form of a passive component, for example a resistor or a diode. The electrical connection to the first busbar 9 and to the second busbar 10 is made by means of further bridging elements 25 and 26 which may likewise be in the form of a passive component or metal platelet having a ferrite core. Owing to the configuration provided, the two busbars 9, 10 are electrically conductively connected by means of two passive components. The bridging elements 25 and 26 or 14 and 23 can in this case be in the form of a resistor element or a ferrite core. The component 22 serves the purpose of filtering interference frequencies within the data bus signal.

In order to make it possible to test a coupled CAN bus subscriber individually, electrically stripped sections 27 are provided shortly downstream of where the film conductors 2–5 emerge, in order to provide direct electrical access for test probes of diagnostic testing equipment. In this case, in its simplest form, small windows can be cut into the film of the film conductor 4.

In a departure from the embodiment illustrated, the bridging elements 12–14, 23, 25, 26 may be in the form of switching tongues of electrically or mechanically operable switches, whose control elements are mounted on the outside of the distribution frame 1. In this manner, the distribution frame may, without the bridging elements 11–14 being removed but rather by actuating the switches, be switched to a state in which individual or all of the electrical components provided on the distribution frame can be connected or disconnected separately. In this manner, the electrical components can be tested separately, disconnected completely from the distribution frame 1 in the event of a fault or else operated individually.

What is claimed is:

1. Distribution frame for film conductors, comprising:

a first busbar, arranged in a recess in a part-shell, for a first signal path;

a second busbar, arranged in another recess in another part-shell, for a second signal path, each busbar being connectable, via a bridging element to two or more film conductors coupled to electrical components;

wherein a connection between the first or second busbar and said electrical components is releasable by moving the bridging element, the two part-shells abutting against one another at an interface when the distribution frame is assembled; and further wherein the film conductors of a signal path are routed through one or more ducts in one of the part-shells and are bent back at the end of the ducts such that the bent-back part of the film conductors is arranged in a region of the interface between the part-shells when the distribution frame is assembled.

2. Distribution frame according to claim 1, wherein the bent-back parts of the film conductors lie on a plane which, when the distribution frame is assembled, lies parallel to at least one plane on which the first or second busbar lies.

3. Distribution frame according to claim 2, wherein recesses for two or more bridging elements are provided in a part-shell.

4. Distribution frame according to claim 2, wherein the bridging element is in the form of a flat component which electrically couples the first and second busbars to one another.

5. Distribution frame according to claim 2, wherein the bridging element is connected to an electrical filter.

6. Distribution frame according to claim 2, wherein the bridging element is in the form of a flat electrically conductive contact, which is arrangeable between the bent-back parts of the film conductors and the first or second busbar when the electrical components connected to the film conductors are to be connected to the distribution frame.

7. Distribution frame according to claim 2, wherein the distribution frame is a star coupler for a data bus having at least two data bus signal paths, one signal path being connected to the first busbar and a further signal path being connected to the second busbar.

8. Distribution frame according to claim 1, wherein recesses for two or more bridging elements are provided in a part-shell.

9. Distribution frame according to claim 8, wherein the bridging element is in the form of a flat component which electrically couples the first and second busbars to one another.

10. Distribution frame according to claim 8, wherein the bridging element is connected to an electrical filter.

11. Distribution frame according to claim 8, wherein the bridging element is in the form of a flat electrically conductive contact, which is arrangeable between the bent-back parts of the film conductors and the first or second busbar when the electrical components connected to the film conductors are to be connected to the distribution frame.

12. Distribution frame according to claim 8, wherein the distribution frame is a star coupler for a data bus having at least two data bus signal paths, one signal path being connected to the first busbar and a further signal path being connected to the second busbar.

13. A Distribution frame according to claim 1, wherein the bridging element is in the form of a flat component which electrically couples the first and the second busbars to one another.

14. Distribution frame according to claim 13, wherein the bridging element is in the form of a flat electrically conductive contact, which is arrangeable between the bent-back parts of the film conductors and the first or second busbar when the electrical components connected to the film conductors are to be connected to the distribution frame.

15. Distribution frame according to claim 13, wherein the distribution frame is a star coupler for a data bus having at least two data bus signal paths, one signal path being connected to the first busbar and a further signal path being connected to the second busbar.

16. Distribution frame according to claim 1, wherein the bridging element is connected to an electrical filter.

17. Distribution frame according to claim 16, wherein the distribution frame is a star coupler for a data bus having at least two data bus signal paths, one signal path being connected to the first busbar and a further signal path being connected to the second busbar.

18. Distribution frame according to claim 1, wherein a bridging element is in the form of a flat electrically conductive contact, which is arrangeable between the bent-back parts of the film conductors and the first or second busbar when the electrical components connected to the film conductors are to be connected to the distribution frame.

19. Distribution frame according to claim 18, wherein the distribution frame is a star coupler for a data bus having at least two data bus signal paths, one signal path being connected to the first busbar and a further signal path being connected to the second busbar.

20. Distribution frame according to claim 1, wherein the distribution frame is a star coupler for a data bus having at least two data bus signal paths, one signal path being connected to the first busbar and a further signal path being connected to the second busbar.

* * * * *